United States Patent
Kowalski et al.

(10) Patent No.: US 9,878,476 B2
(45) Date of Patent: Jan. 30, 2018

(54) SYSTEM AND PROCESS FOR MOLDING POLYMERIC ARTICLES WHILE REDUCING GATE BLUSH

(71) Applicant: Ticona LLC, Florence, KY (US)

(72) Inventors: Michael P. Kowalski, Warren, MI (US); Robert A. Felster, Emmett, MI (US); Scott A. Klingler, Ortonville, MI (US)

(73) Assignee: Ticona LLC, Florence, KY (US)

(*) Notice: Subject to any disclaimer, the term of this patent is extended or adjusted under 35 U.S.C. 154(b) by 1080 days.

(21) Appl. No.: 13/661,591

(22) Filed: Oct. 26, 2012

(65) Prior Publication Data

US 2013/0123424 A1    May 16, 2013

Related U.S. Application Data

(60) Provisional application No. 61/552,856, filed on Oct. 28, 2011.

(51) Int. Cl.
| | | |
|---|---|---|
| B29C 45/26 | (2006.01) | |
| B29C 45/27 | (2006.01) | |
| B29C 45/00 | (2006.01) | |

(52) U.S. Cl.
CPC ...... *B29C 45/2669* (2013.01); *B29C 45/2703* (2013.01); *B29C 45/0025* (2013.01)

(58) Field of Classification Search
CPC ............ B29C 45/2669; B29C 45/2703; B29C 45/0025
See application file for complete search history.

(56) References Cited

U.S. PATENT DOCUMENTS

| | | |
|---|---|---|
| 3,427,639 A | 2/1969 | Strauss |
| 5,043,398 A | 8/1991 | Auerbach et al. |
| 5,683,731 A | 11/1997 | Deardurff et al. |
| 6,478,572 B1 | 11/2002 | Schad |
| 6,825,266 B2 | 11/2004 | Taraiya |
| 6,868,371 B1 | 3/2005 | Feldman et al. |
| 7,449,239 B2 | 11/2008 | Seeger et al. |
| 8,034,855 B2 * | 10/2011 | Asai .................. C08L 59/04 524/102 |
| 8,975,313 B2 * | 3/2015 | Mulholland ......... C08K 5/3475 524/233 |

(Continued)

FOREIGN PATENT DOCUMENTS

| | | |
|---|---|---|
| JP | H08323817 | 12/1996 |
| JP | 2002/018908 | 1/2002 |
| JP | 2009/241461 | 10/2009 |

OTHER PUBLICATIONS

Anonymous—GE Plastics: "Injection Molding Processing Guide", Aug. 27, 1999 (Aug. 27, 1999), pp. 1-52, XP002707352.

(Continued)

*Primary Examiner* — Kevin R Kruer
(74) *Attorney, Agent, or Firm* — Dority & Manning, P.A.

(57) ABSTRACT

A system and process for injection molding polymer articles is described. The system and process are designed to reduce gate blush. In one embodiment, an injection molding device injects a molten polymer composition into a runner that extends from an injection point to a gate. The gate is positioned adjacent to an opening leading into a mold cavity. In accordance with the present disclosure, the system includes one or more overflow passages that divert flow of the polymer composition so as to temporarily reduce the flow rate and pressure of the polymer composition entering the mold.

15 Claims, 7 Drawing Sheets

(56) References Cited

U.S. PATENT DOCUMENTS

| | | | |
|---|---|---|---|
| 2006/0165832 A1 | 7/2006 | Allan et al. | |
| 2007/0027300 A1 | 2/2007 | Zierer et al. | |
| 2007/0069424 A1 | 3/2007 | Veilleux et al. | |
| 2008/0242800 A1 | 10/2008 | Disch et al. | |
| 2012/0018927 A1* | 1/2012 | Watanabe | B29C 45/2669 |
| | | | 264/500 |
| 2012/0195996 A1* | 8/2012 | Wu | B29C 45/27 |
| | | | 425/557 |

OTHER PUBLICATIONS

Anonymous—Ticona: "Variotherm mold temperature control enables production of fast-cycling molded parts without weld lines and cold spots", Jan. 22, 2010 (2010-22), pp. 1-2, XP002707353.

Hatch, B. "The Troubleshooter, Part 32: Problems with an acetal part", Jul. 12, 1999 (Jul. 12, 1999) pp. 1-3, XP002707354.

Anonymous: "Profiling", Jan. 8, 2010 (Jan. 8, 2010), pp. 1-5, XP002707355.

Anonymous—Ticona: "Bright prospects Hostaform POM MetaLX with metallic look", Oct. 2010 (Oct. 2010), pp. 1-2, XP002707356.

Anonymous: "Getting" rid off gate blushing in monitor front bezel, Feb. 15, 2002 (Feb. 15, 2002), Mar. 2, 2002 (Mar. 2, 2002), p. 1-28, XP002707357.

Poppe E. et al: "Technische Kunststoffe: Die Top Ten Der Spritzgiessprobleme", Plastverarbeiter, Huethig GMBH, Heidelberg, DE vol. 46, No. 6, Jun. 1, 1995, p. 48/49, XP000522416, ISSN: 0032-1338.

Search Report and Written Opinion for Application No. PCT/US2012/062102 dated Dec. 8, 2013.

* cited by examiner

SYSTEM AND PROCESS FOR MOLDING POLYMERIC ARTICLES WHILE REDUCING GATE BLUSH

RELATED APPLICATIONS

The present application is based upon and claims priority to U.S. Provisional Patent Application Ser. No. 61/552,856 filed on Oct. 28, 2011, which is incorporated herein by reference.

BACKGROUND

In the relatively recent past, there has been an increasing desire to replace metallic parts with parts made from polymer materials, particularly high performance thermoplastic polymers. The need extends to almost a limitless variety of different applications and fields. For instance, parts made from thermoplastic polymers are used in consumer appliance products, industrial processes, in all sorts of transportation vehicles, and the like. For example, there is an increasing demand to replace metal parts in the automotive field with parts made from thermoplastic polymers. The parts made from the thermoplastic polymers, for instance, may be used on the exterior of the vehicle or on the interior of the vehicle.

When used in automotive applications, for instance, the parts made from thermoplastic polymers typically are required to have an aesthetic appearance in order to further increase the appeal of the vehicle. Thus, in many applications, after being molded, the parts are then painted or otherwise decorated in order to color coordinate with the environment in which they are used. Unfortunately, painting the plastic parts represents a substantial expense in the production of the part. Having to paint the part also increases production time and can significantly add capital expense to the facilities in which the parts are produced.

In view of the above, those skilled in the art have attempted to add coloring agents to thermoplastic polymers in order to forego having to paint the molded parts. In one embodiment, for instance, metallic pigments are added to thermoplastic compounds to provide molded parts having a metallic appearance. During injection molding of polymer articles, however, various surface defects can appear during production of the part. For example, certain part geometries, mold layouts, the location of gates, and molding conditions can cause various drawbacks including increased gloss loss on weathering and visual defects affecting part aesthetics. One particular reoccurring problem is known as "gate blush" which results in irregular dark patterns or a dull or discolored area near the gate location of an injection mold. Another reoccurring problem is the formation of flow lines in the finished part formed at the meeting of two flow fronts when the mold configuration includes more than one gate. These flow lines are sometimes referred to in the art as "knit-lines".

Knit-lines can be eliminated in many applications by having a mold configuration that only includes a single gate or point of entry for molten thermoplastic material into the mold. Attempts to eliminate gate blush, on the other hand, have generally been unsuccessful in many different molding configurations. Controlling molding conditions, such as injection speed, or moving the gate to a particular location on the mold has not been found to consistently eliminate gate blush. Also conventional is the use of cold slug passages, which are small protrusions located close to the gate. Despite the presence of cold slug passages, gate blush continues to occur. Reducing the fill rate of the mold has also not consistently eliminated gate blush and also results in a slow cycle time. Those skilled in the art simply do not have a good understanding of why gate blush occurs in certain circumstances and therefore have been unable to completely solve the problem.

SUMMARY

The present disclosure is generally directed to a molding process and system for injection molding articles that substantially eliminates gate blush. For example, in one embodiment, the present disclosure is directed to an injection mold system containing polymer flow passages leading to one or more mold gates. Near the location of one of the gate points, in accordance with the present disclosure, the system includes one or more terminal overflow passages that collectively have a volume of from about 20% to about 1000% of the melt volume of the overflow passage to the gate. During injection molding, a portion of the polymer flow is diverted into the overflow passages for a time sufficient for the polymer flow to enter the one or more gates and enter the mold. After the overflow passages are filled, the polymer flow is no longer partially diverted and a maximum flow rate is achieved into the mold. The present inventors discovered that the above temporary decrease in flow rate in the mold for a certain amount of time reduces or eliminates gate blush without substantially affecting processing speeds.

In one embodiment, for instance, the present disclosure is directed to a system for injection molding a polymer article that includes a mold, an injection device in fluid communication with the mold, and a flow path located between the injection device and the mold. The flow path includes an injection point for receiving the flow of a polymer material from the injection device. The flow path also includes a gate positioned downstream from the injection point on the flow path. The gate is located at or adjacent to an opening leading into the mold.

In accordance with the present disclosure, the system includes at least one overflow passage in fluid communication with the flow path between the injection point and the gate. The overflow passage is configured such that during initial flow of a polymer material through the flow path, a portion of the flow is diverted temporarily to at least one overflow passage causing a flow rate of a polymer material through the gate to be reduced temporarily and then increased.

For example, in one embodiment, the system may include from about one to about five overflow passages, such as from about two to about five overflow passages. Collectively, the overflow passages have a defined volume such that the overflow passages do not fill with a flow of the polymer material until only after the polymer material enters the one or more gates and enters the mold. The volume of the overflow passages, for instance, may be from about 20% to about 1000% of a volume of the flow path from the overflow passage to the gate. The overflow passages can divert generally from about 5% to about 60% of the flow of polymer material through the flow path, such as from about 20% to about 50% of the flow of the polymer material.

In addition to an injection molding system, the present disclosure is also directed to a process for molding a polymer material. The process includes the steps of feeding a molten polymer material into a flow path that leads into the mold cavity. During initial flow of the polymer material into the flow path, a portion of the flow, such as a portion of the flow mass, is temporarily diverted into an overflow passage in a manner that produces a reduced initial flow rate into the mold. The mold cavity is filled with the polymer material to form a molded article. During filling of the mold cavity, the flow, such as the initial flow mass, of the polymer material into the mold includes an initial flow rate and a later fill flow rate. The initial flow rate is from about 5% to about 90% less than the fill flow rate, such as from about 5% to about 50% of the fill flow rate. After the mold cavity is filled, a molded article is then removed from the mold.

Various different polymer materials may be processed according to the present disclosure without limitation. In one embodiment, for instance, the polymer material may comprise a polyoxymethylene polymer that includes a coloring agent, such as a metallic pigment.

In an alternative embodiment, the present disclosure is also directed to a system for injection molding an appearance polymer article from a thermoplastic material. The system includes a mold comprising at least one void forming a mold cavity. The system also includes a compression zone for heating and compressing a thermoplastic material. The system further includes at least one runner ending in a gate at the opening of the mold cavity. The runner is in fluid communication between the compression zone and the gate. In accordance with the present disclosure, the system further includes at least one terminal flow-diversion passage forming a void in fluid communication with the runner. The terminal flow-diversion passage is located a predetermined distance from the gate, wherein the void volume of the terminal flow-diversion passage is at least 1.1 times the runner void volume remaining between the flow-diversion passage and the gate. During injection molding, the flow rate of the portion of the thermoplastic flow initially filling the mold cavity is diminished while another portion of the thermoplastic material flows into the terminal flow-diversion passage.

The present disclosure is also directed to molded products made by the above process. In one embodiment, the molded product comprises a thermoplastic polymer molded into an article having an exterior surface. At least a portion of the exterior surface comprises an appearance surface that is intended to be viewable when the product is in use. For instance, if the molded product is a trim bezel for a car interior, the appearance surface is the portion of the exterior surface that is visible when a driver or passenger is in the vehicle.

The molded product is produced through injection molding by injecting a thermoplastic polymer into a mold through a gate. In many applications, the gate is located adjacent to the appearance surface. In accordance with the present disclosure, the appearance surface is gate blush-free.

In one embodiment, for instance, the molded product is made from a polyoxymethylene polymer that includes at least one colorant. By being able to produce an appearance surface that is gate blush-free, the product can be immediately incorporated into an end use product without having to be painted. Thus, the appearance surface can also be free of paint.

Other features and aspects of the present disclosure are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
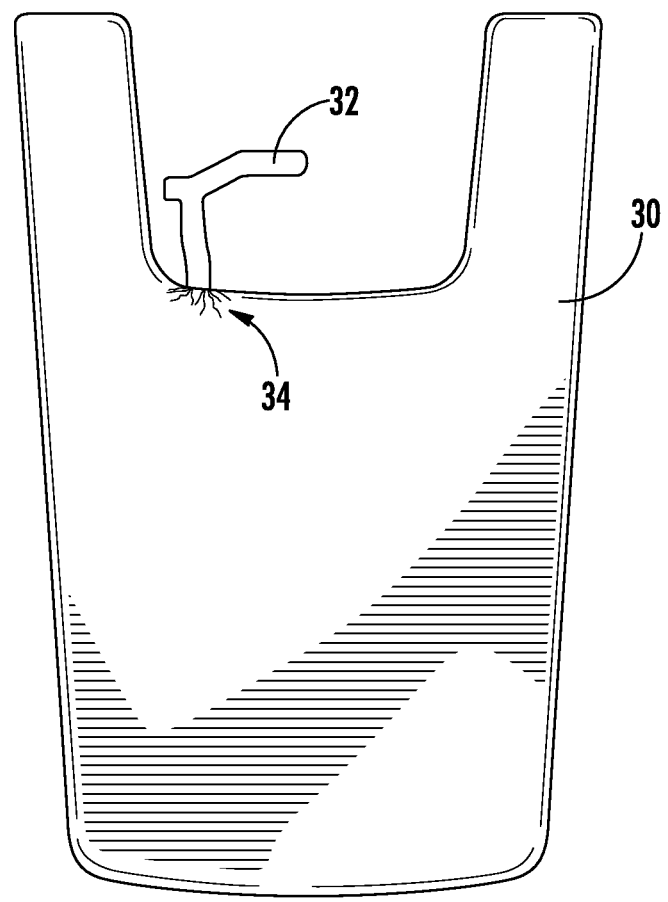
FIG. 1 is a plan view illustrating a conventionally molded article.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

The present disclosure is generally directed to a system for producing molded articles and to a process for molding articles while reducing or eliminating gate blush. In general, the system of the present disclosure includes a mold defining a mold cavity in fluid communication with an injection device. The injection device is configured to heat and inject molten thermoplastic materials into the mold. In between the mold and the injection device is a flow path or runner system. The flow path ends in a gate that is positioned adjacent to the mold cavity. In accordance with the present disclosure, the flow path includes at least one overflow passage.

The one or more overflow passages are positioned upstream from the gate on the flow path. When a flow of a polymer material enters the flow path, a portion of the flow is diverted into the one or more overflow passages for a temporary period of time. More specifically, an amount of the polymer flow is diverted for a time sufficient for the polymer flow to enter the mold cavity through the gate. In this manner, initial flow of the polymer into the gate is temporarily reduced until the overflow passages have become filled with the polymer material. Once the one or more overflow passages become filled with the polymer material, flow of the polymer material into the mold cavity increases to a maximum flow rate.

The present inventors discovered that a temporary decrease in flow rate into the mold cavity reduces or eliminates gate blush. It was also surprisingly discovered that increasing the flow rate after an initial decrease does not result in further gate blush issues. In this manner, gate blush is reduced or eliminated without significantly interfering with processing speeds.

Gate blush is a surface imperfection that can appear as a discoloration in the gate area of an injection-molded article. The gate area is the portion on the appearance surface of the product formed adjacent to the gate where the thermoplastic polymer is injected into the mold. The gate area, for instance, can be circular and have a diameter of less than about 5 $mm^2$, such as less than about 4 $mm^2$, such as less than about 3 $mm^2$, such as less than about 2 $mm^2$, such as less than about 1 $mm^2$. The center of the gate area is concentric with the position of the gate. As the thermoplastic polymer is injection molded through the gate, gate blush can form and represent a series of curves located in the gate area.

Gate blush can be defined in different ways. In one embodiment, for instance, gate blush comprises a helical pattern of melt fractures that, in one embodiment, are visible to the human eye. In other embodiments, the helical patterns are visible when examined through a scanning electron microscope at ×100 magnification and at an angle of 45°. In one embodiment, at least some of the melt fractures have a length of at least 20 microns, such as at least 20%, such as at least 40%, such as at least 60%.

Gate blush can also be determined through a surface imperfection monitoring technique known as the BORG spectrophotometric technique, which is described in U.S. Pat. No. 6,868,371, which is incorporated herein by reference. In this technique, a spatially resolved spectrophotometer is used to measure surface imperfections in molded plastic parts. The measurements from one or more of these sample plastic parts are then provided to a computerized device, which appropriately filters the data and calculates overall data shape, average peak and valley shift, and a quality number indicative of data slopes. In this method, a sample molded part is mounted on a sample holder that is optionally mounted on motorized translation stages, so as to scan across the feature of interest on the sample surface. A computerized device automates the motion system and data collection, and transforms the raw data into color coordinates. This data is processed by taking into consideration the instrument calibration data obtained beforehand, and allows the user to optimize the signal to noise by allowing adjustment of parameters. The instrument then calculates the difference in the color index between the lightest and darkest points across a streaked region.

Surface imperfections are typically detected by measurement of a reduction in the color index (hereinafter sometimes referred to as "L") which corresponds physically to the imperfection (e.g., the gate blush).

Using the above technique, a color index can be measured at a surface imperfection such as in the gate area of a molded product. The color index can also be measured away from the imperfection. A percent difference in color shift can then be calculated from the two measurements.

In accordance with the present disclosure, minimized surface imperfections results in small differences in the color index measured at the gate area and on the remainder of the appearance surface. For instance, in one embodiment, the color index in the gate area can vary by no more than 20%, such as by no more than 10%, such as no more than 5% in the gate area versus the color index over the remainder of the appearance surface.

One method for using the BORG spectrophotometric technique is described in U.S. Pat. No. 6,825,266, which is also incorporated herein by reference.

Figure 5:
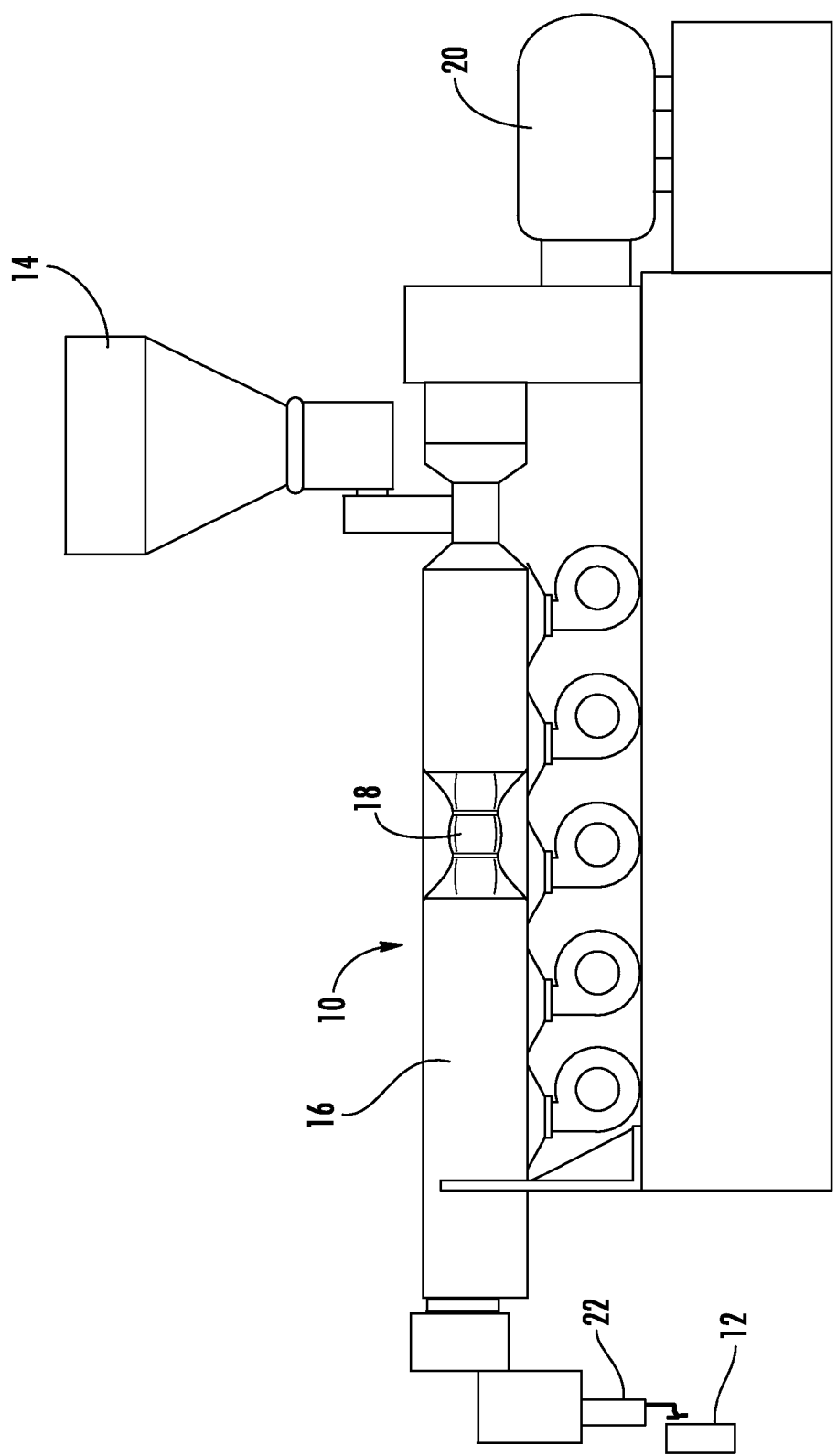
FIG. 5 is a side view with cutaway portions of an injection molding system in accordance with the present disclosure.

Referring to FIG. 5, one embodiment of an injection molding system that may be made in accordance with the present disclosure is shown. As illustrated, the system includes an injection device 10 that is configured to melt or soften a polymer material and to inject the molten polymer material into a mold 12. A polymer composition can be fed to the injection device 10 in any suitable manner. In the embodiment illustrated in FIG. 5, for instance, the system includes a hopper 14 for receiving a polymer composition and supplying the composition to the injection device 10.

The injection device 10 includes a barrel 16 which contains a heater and a conveying device. The conveying device may comprise, for instance, one or more feed screws 18. For instance, in the embodiment illustrated in FIG. 5, the barrel 16 includes a single feed screw 18. In other embodiments, however, the barrel 16 may contain dual feed screws. The feed screw 18 is rotated by a motor 20. The motor 20, for instance, may comprise an electric motor that is connected to the feed screw 18 by one or more belts or chains.

When a polymer composition is added to the hopper 14, the polymer composition is heated within the barrel 16 into a molten state. The feed screw 18 conveys the molten polymer material from the barrel 16 into a flow path 22. The flow path 22 can communicate with the injection device 10 by an injection point. From the flow path 22, the polymer material is injected into a mold cavity of the mold 12 for producing molded articles.

Referring to FIG. 1, a molded article 30 made according to conventional processes is illustrated. When the molded article 30 is removed from a mold cavity, an extension 32 is included made from the polymer composition that represents the flow path from the injection point to the mold cavity. The extension 32 is typically removed from the molded article 30 prior to use. In certain embodiments, the extension 32 is then recycled and reused in other molding processes.

As shown in FIG. 1, in the past, problems were experienced at the point of entry of the polymer material into the mold cavity. In particular, visual defects formed where the polymer material entered the mold cavity. These defects are referred to as gate blush 34 as shown in FIG. 1. In many instances, the gate blush 34 can appear as an irregular dark pattern or as a web-like imperfection that substantially decreases the aesthetic appeal of the part and can lead to the part being rejected by manufacturers.

Figure 2:
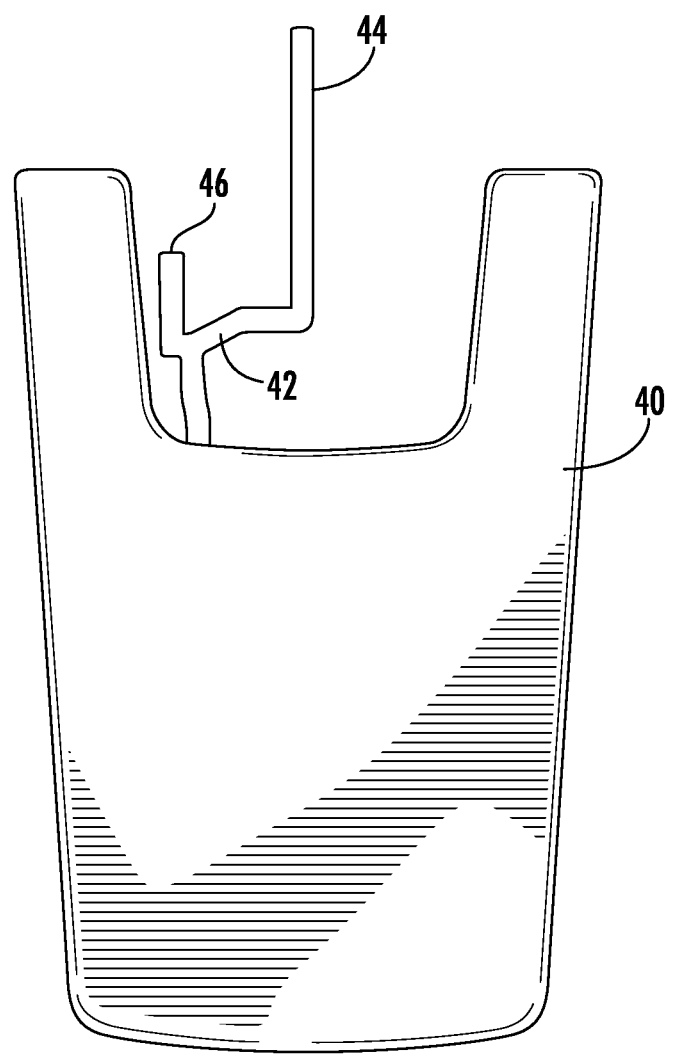
FIG. 2 is a plan view of one embodiment of a molded article in accordance with the present disclosure.

Referring to FIG. 2, a molded article 40 made in accordance with the present disclosure is shown. As illustrated, the molded article 40, similar to the embodiment illustrated in FIG. 1, includes an extension 42 that represents a flow path from an injection point of an injection device to the opening of a mold cavity that produces the molded article 40. In accordance with the present disclosure, however, the extension 42 further includes one or more overflow passages. In the embodiment illustrated in FIG. 2, for instance, the extension 42 includes a first overflow passage 44 and a second overflow passage 46. As will be explained in greater detail below, during filling of the mold cavity that forms the molded article 40, a portion of the polymer flow leaving the injection point of the injection device is diverted into the overflow passages 44 and 46. While the polymer flow is diverted into the flow passages 44 and 46, the flow rate and/or the velocity of the polymer flow is temporarily reduced. The overflow passages 44 and 46 have a volume sufficient such that the overflow passages do not fill with the polymer composition until only after the polymer flow has entered the mold cavity for forming the molded article 40. Once the overflow passages 44 and 46 are filled with the polymer flow, full flow then resumes into the mold cavity for forming the molded article 40.

As shown in FIG. 2, the presence of the overflow passages 44 and 46 reduce or substantially eliminate gate blush at the entrance to the mold cavity.

Referring to FIGS. 3, 4A, 4B and 4C, a cross-sectional view of the mold 12 is shown in conjunction with a cross-sectional view of the flow path 22. As shown, the mold 12 includes a mold cavity 50 that is in fluid communication with the flow path 22. The flow path 22 includes an injection point 52 positioned upstream from a gate 54. The gate 54 is positioned adjacent to the mold cavity 50. In the embodiment illustrated in FIG. 3, only a single gate 54 is included. In other embodiments, however, more than one gate may be in communication with the flow path 22.

In accordance with the present disclosure, the flow path 22 is also in communication with one or more overflow passages. In the embodiment illustrated in FIG. 3, for instance, the flow path 22 is in communication with a first overflow passage 56 and a second overflow passage 58. As described above, when a polymer flow is fed through the flow path 22, a portion of the polymer flow is diverted into the overflow passages 56 and 58. Flow continues into the overflow passages 56 and 58 at least until the polymer flow enters the mold cavity 50 through the gate 54. In one embodiment, flow is diverted into the overflow passages 56 and 58 until the mold cavity is filled with the polymer composition. In other embodiments, however, the polymer flow is only temporarily diverted into the overflow passages. When temporarily diverted, the polymer flow enters the mold cavity 50 at a reduced flow rate and then increases when flow is no longer diverted into the overflow passages.

Figure 4A:
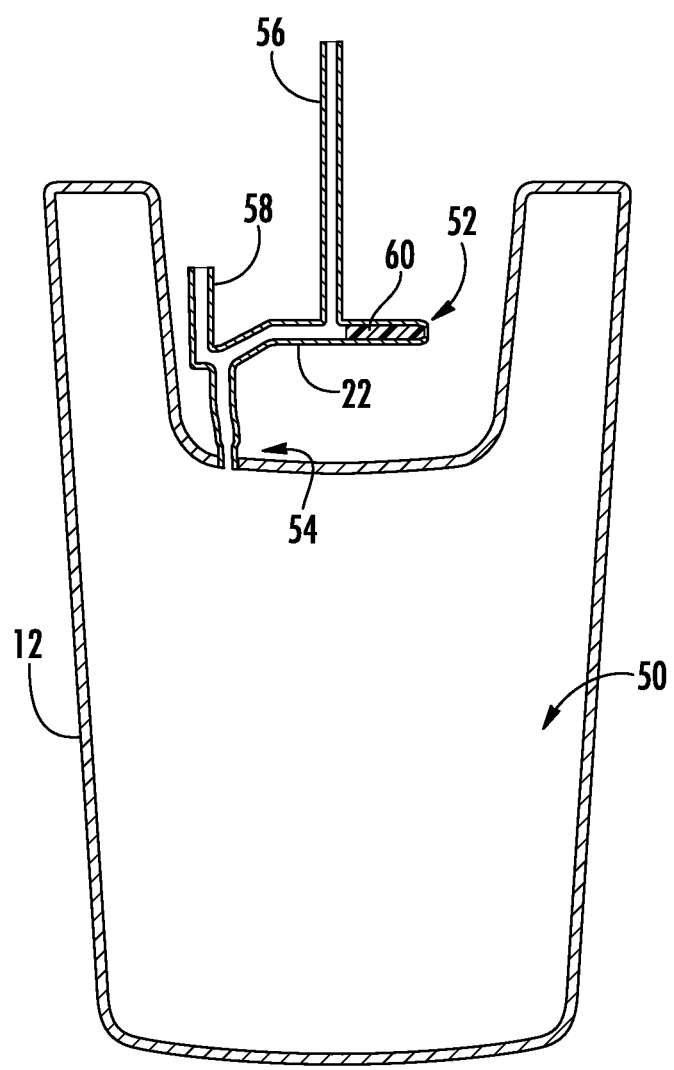
FIGS. 4A, 4B and 4C illustrate one embodiment of a process in accordance with the present disclosure for forming a molded article through injection molding.
Figure 4B:
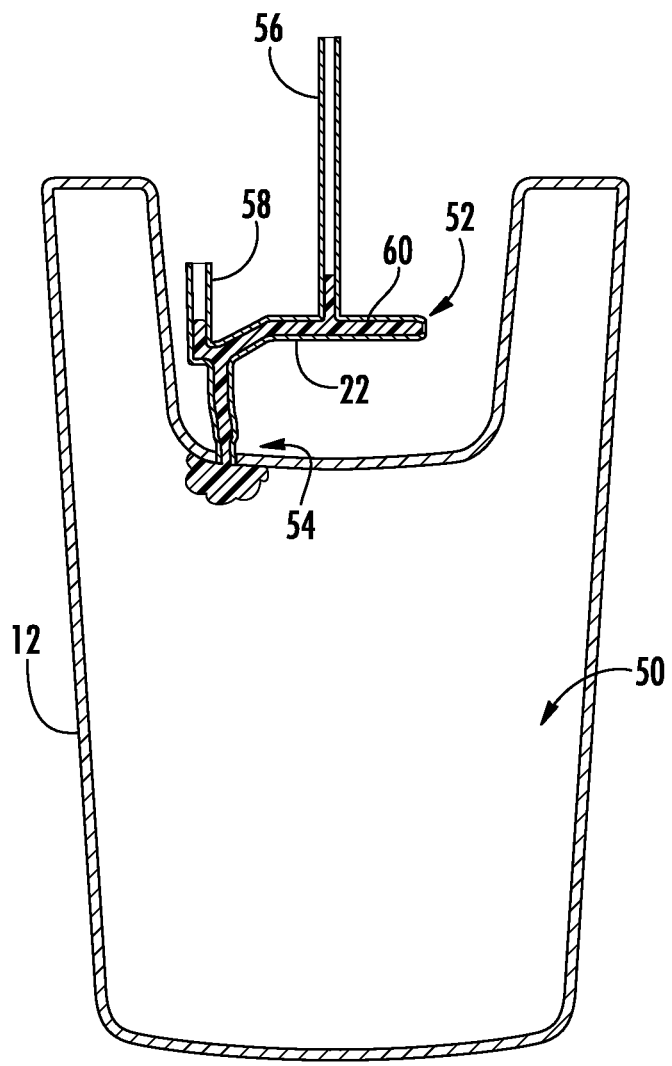
Figure 4C:
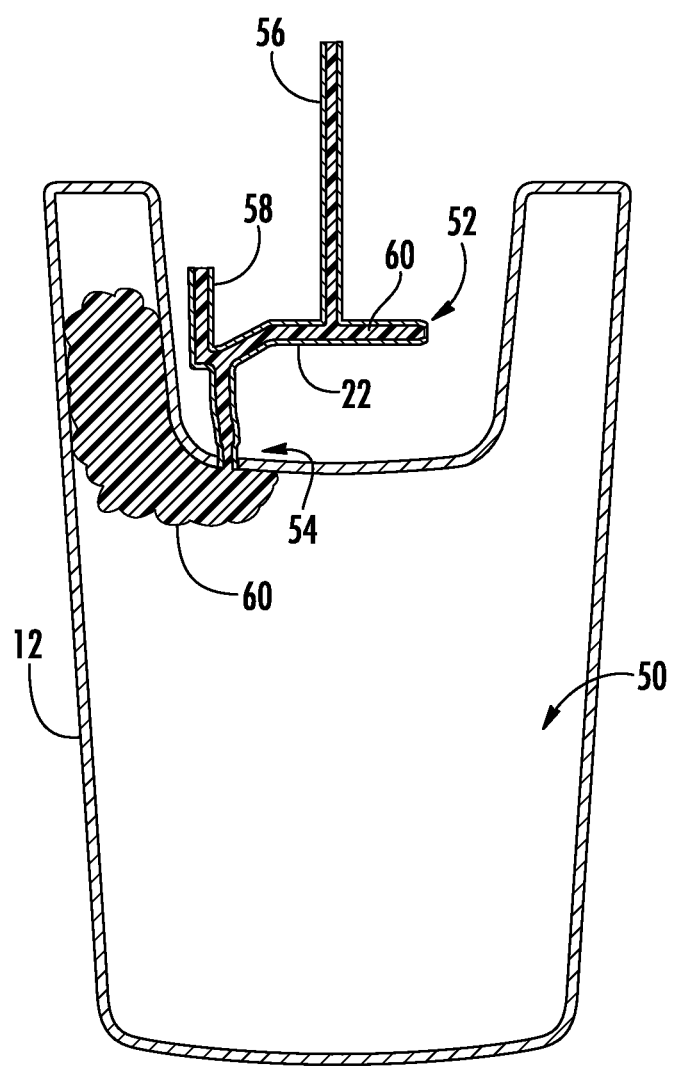

Referring to FIGS. 4A through 4C, sequential views are shown of a polymer flow entering the flow path 22 in accordance with the present disclosure and filling the mold cavity 50. Referring to FIG. 4A, for instance, a polymer flow 60 is shown entering the flow path 22. The polymer flow 60 is fed into the flow path 22 from an injection device as shown in FIG. 5.

As shown in FIG. 4B, as the polymer flow 60 enters the flow path, a portion of the polymer flow is diverted into the first overflow passage 56 and into the second overflow passage 58. The overflow passages 56 and 58 have sufficient volume such that a portion of the polymer flow is diverted for a time sufficient for the polymer flow to enter the mold cavity 50 through the gate 54. Thus, in FIG. 4B, the polymer flow 60 enters the mold cavity at a reduced flow rate.

Referring now to FIG. 4C, after a period of time, the overflow passages 56 and 58 completely fill with the polymer composition. When the overflow passages are filled with the polymer composition, a portion of the polymer flow 60 is no longer diverted into the overflow passages. Thus, as shown in FIG. 4C, the entire polymer flow 60 flows into the mold cavity 50 for producing a molded article.

The overflow passages divert the incoming polymer flow and reduce instantaneous pressure as the initial polymer flow passes the gate 54. The fill rate into the mold cavity 50 is thus reduced for a time as the polymer flow advances beyond the gate during mold filling. The injection device can be further controlled to provide a desired injection rate. The reduction in instantaneous pressure and flow rate into the mold cavity 50 due to the presence of the overflow passages 56 and 58 at least in the initial mold cavity fill and possibly during the entire mold cavity fill reduces or substantially eliminates gate blush. The flow rate at the gate of the polymer composition may remain reduced during a portion or all of the mold fill depending upon the relative size of the overflow passages as compared to the flow rate which would have occurred absent the overflow passage.

Figure 3:
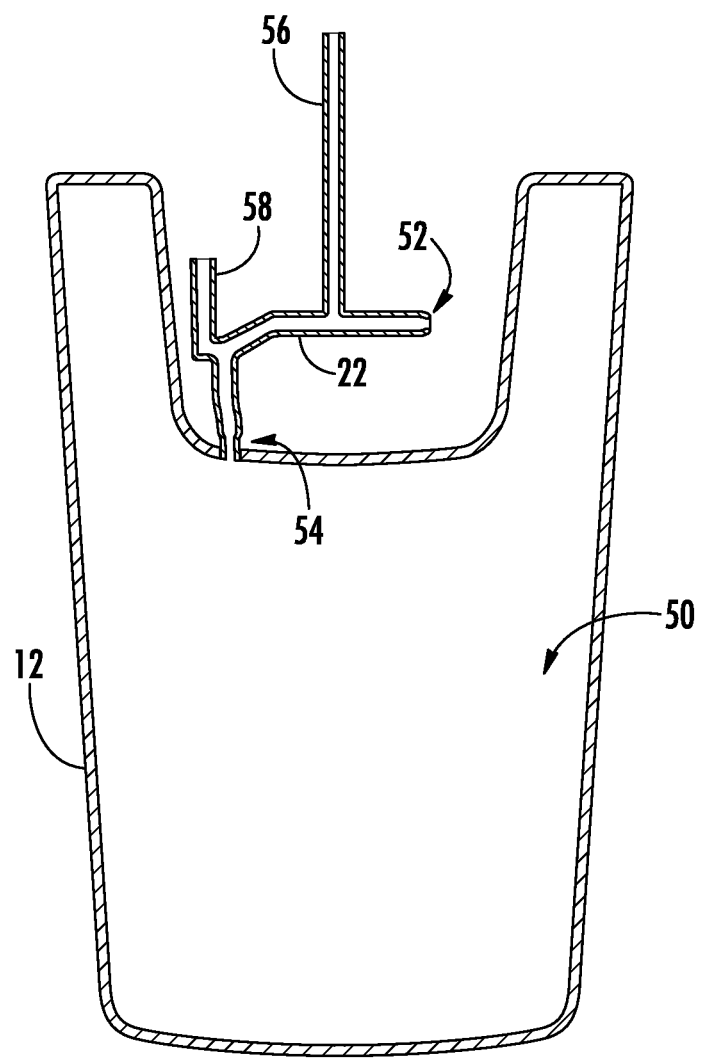
FIG. 3 is a cross-sectional view of a mold cavity and a runner system leading into the mold cavity in accordance with the present disclosure.

As shown in FIG. 3, the overflow passages 56 and 58 are located in between the injection point 52 and the gate 54. The size or volume of the overflow passages can depend on various factors. Overflow passages having a larger volume, for instance, are needed the farther away the gate is located from the overflow passages. The overflow passages may need to also have a larger volume depending upon the higher the intervening volume of polymer flow from the flow passages to the gate. In general, the flow passages 56 and 58 and the volume of the flow passages can be adjusted in order to minimize the creation of waste material while also achieving sufficient reduction in the initial instantaneous melt pressure and mold fill rate during at least the initial seconds of mold fill.

In general, the volume of the one or more overflow passages is from about 20% to about 1000% of the volume of the flow path from the overflow passages to the gate. In certain embodiments, for instance, the one or more overflow passages may have volumes ranging from about 50% to about 500%, such as from about 100% to about 500% of the volume of the flow path between the overflow passages and the gate opening. In one particular embodiment, the ratio of the volume of the overflow passages is from about 1.1 to about 2 times greater than the volume of the flow path between the flow chamber and the gate.

Ultimately, the flow passages should divert a sufficient amount of the polymer flow for a sufficient amount of time in order to reduce or eliminate gate blush. The amount of the polymer flow diverted into the overflow passages, for instance, can be from about 5% to about 60% of the total polymer flow, such as from about 20% to about 50% of the total polymer flow. In one particular embodiment, for instance, the one or more overflow passages may divert from about 25% to about 40% of the polymer flow entering the flow path.

The amount of flow diverted into the one or more overflow passages from the polymer flow can be controlled using a number of techniques. For instance, the proportion of flow diversion can be controlled by including more or less overflow passages. The amount of flow diverted can also be controlled by adjusting the cross-sectional area of the overflow passages in relation to the cross-sectional area of the flow passage. The cross-sectional area of the overflow passages, for instance, may be from about 25% to about 200% of the cross-sectional area of the flow passage. In one embodiment, for instance, the overflow passages have a cross-sectional area that is less than the cross-sectional area of the flow passage or runner. For instance, the cross-sectional area of the overflow passages can be greater than about 30%, such as greater than about 40%, such as greater than about 50% of the cross-sectional area of the flow passage and can be generally less than about 90%, such as less than about 80%, such as less than about 70% of the cross-sectional area of the flow passage. In an alternative embodiment, the cross-sectional area of the overflow passages can be greater than 100%, such as from about 110% to about 200% of the cross-sectional area of the flow passage. The cross-sectional area of the overflow passages can be fixed or may be variable using a suitable valve device.

The amount of time that the polymer flow is diverted may depend on various factors but is at least sufficient for the polymer flow to pass through the gate and enter the mold cavity. In general, the amount of time the polymer flow is diverted into the overflow passages is at least about 1%, such as at least about 3%, such as at least about 5%, such as at least about 10%, such as at least about 20% of the amount of time necessary to completely fill the mold cavity 50. In one embodiment, for instance, the polymer flow is diverted into the overflow passages an amount of time from about 5% to about 50%, such as from about 5% to about 20% of the total amount of time to fill the mold cavity.

Thus, the flow rate and velocity of the polymer flow entering the mold cavity is reduced in an amount from about 5% to about 60% for an amount of time of from about 1% to about 50% of the total fill time of the mold.

In the embodiment illustrated in FIG. 3, the system includes two overflow passages 56 and 58. It should be understood, however, that more or less overflow passages may be incorporated into the system depending upon the particular application and the desired result. In general, for instance, from about one to about five overflow passages may be placed in communication with a single flow path.

In the embodiment illustrated in FIG. 3, the overflow passages 56 and 58 have a defined volume. In other embodiments, however, the overflow passages may be open ended wherein a portion of the polymer flow is continuously diverted through the process or the portion of the polymer flow diverted into the overflow passages may recirculate back into either the flow passage 22 or into another conduit. In still another embodiment, each of the overflow passages 56 and 58 may be associated with a valve. The valve can be configured to open and close flow into the overflow passages and/or control the amount of flow into the overflow passages. For example, when polymer flow through the flow path 22 is initiated, the valves may open to allow a portion of the polymer flow to enter the flow passages. Once the polymer flow has passed through the gate 54 and entered the mold cavity 50, the valves may then return to a closed position allowing all of the polymer flow to enter the mold cavity. The valves can also be configured to open a certain amount so that the portion of the polymer flow that is diverted into the overflow passages is controlled.

In one embodiment, each of the overflow passages may be associated with a pressure controlled valve, such as a spring-loaded valve that will react to pressure within the system. Thus, the amount of flow diverted into the overflow passages may depend upon the amount of pressure exerted on the spring-loaded valves.

In general, the system and process of the present disclosure are adaptable to processing any suitable thermoplastic polymer in a molding process, particularly in an injection molding process. In one embodiment, the polymer composition used in the process of the present disclosure includes a thermoplastic polymer combined with a coloring agent for producing molded articles that are ready for use upon exiting the mold cavity. In particular, the coloring agent is present in order to provide a molded article having aesthetic appeal and to forego the necessity of having to paint the molded article or otherwise decorate the molded article.

Thermoplastic polymers that may be processed according to the present disclosure include polyacetal polymers, polyarylene sulfide polymers such as polyphenylene sulfide polymers, polyolefin polymers including polyethylenes and polypropylenes, polycarbonate polymers, polyester polymers including PCT polymers, and the like.

The coloring agent combined with the thermoplastic polymer may comprise a pigment, a dye, metallic particles, and the like. Pigment particles can include, for instance, barium sulfate particles, titanium dioxide particles, calcium carbonate particles, and the like. In another embodiment, the coloring agent may comprise mica flakes alone or in combination with dyes, such as organic dyes.

In one particular embodiment, the polymer composition comprises a polyacetal resin combined with a coloring agent, particularly metal flakes. The polyacetal resin may comprise a homopolymer or a copolymer and can include end caps. The homopolymers may be obtained by polymerizing formaldehyde or trioxane, which can be initiated cationically or anionically. The homopolymers can contain primarily oxymethylene units in the polymer chain. Polyacetal copolymers, on the other hand, may contain oxyalkylene units along side oxymethylene units. The oxyalkylene units may contain, for instance, from about 2 to about 8 carbon units and may be linear or branched. In one embodiment, the homopolymer or copolymer can have hydroxy end groups that have been chemically stabilized to resist degradation by esterification or by etherification.

As described above, the homopolymers are generally prepared by polymerizing formaldehyde or trioxane, preferably in the presence of suitable catalysts. Examples of particularly suitable catalysts are boron trifluoride and trifluoromethanesulfonic acid.

Polyoxymethylene copolymers can contain alongside the —$CH_2O$— repeat units, up to 50 mol %, such as from 0.1 to 20 mol %, and in particular from 0.5 to 10 mol %, of repeat units of the following formula

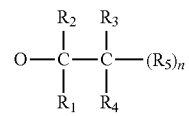

where $R^1$ to $R^4$, independently of one another, are a hydrogen atom, a $C_1$-$C_4$-alkyl group, or a halo-substituted alkyl group having from 1 to 4 carbon atoms, and $R^5$ is —$CH_2$—, —O—$CH_2$—, or a $C_1$-$C_4$-alkyl- or $C_1$-$C_4$-haloalkyl-substituted methylene group, or a corresponding oxymethylene group, and n is from 0 to 3.

These groups may advantageously be introduced into the copolymers by the ring-opening of cyclic ethers. Preferred cyclic ethers are those of the formula

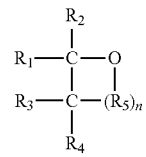

where $R^1$ to $R^5$ and n are as defined above.

Cyclic ethers which may be mentioned as examples are ethylene oxide, propylene 1,2-oxide, butylene 1,2-oxide, butylene 1,3-oxide, 1,3-dioxane, 1,3-dioxolane, and 1,3-dioxepan, and comonomers which may be mentioned as examples are linear oligo- or polyformals, such as polydioxolane or polydioxepan.

Use is also made of oxymethyleneterpolymers, for example those prepared by reacting trioxane with one of the abovementioned cyclic ethers and with a third monomer, preferably a bifunctional compound of the formula

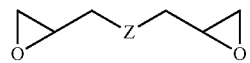

where Z is a chemical bond, —O— or —ORO— (R=$C_1$-$C_8$-alkylene or $C_2$-$C_8$-cycloalkylene).

Preferred monomers of this type are ethylene diglycide, diglycidyl ether, and diethers composed of glycidyl units and formaldehyde, dioxane, or trioxane in a molar ratio of 2:1, and also diethers composed of 2 mol of glycidyl compound and 1 mol of an aliphatic diol having from 2 to 8 carbon atoms, for example the diglycidyl ethers of ethylene glycol, 1,4-butanediol, 1,3-butanediol, 1,3-cyclobutanediol, 1,2-propanediol, or 1,4-cyclohexene diol, to mention just a few examples.

Polyacetal resins as defined herein can also include end capped resins. Such resins, for instance, can have pendant hydroxyl groups. Such polymers are described, for instance, in U.S. Pat. No. 5,043,398, which is incorporated herein by reference.

In one embodiment, the polyacetal polymer may contain hemiformal terminal groups and/or formyl terminal groups. In particular, it is believed that the methods of the present disclosure can advantageously significantly reduce formaldehyde emissions of polyacetal polymers, even when the polymers contain hemiformal terminal groups and possibly formyl terminal groups. For instance, in one embodiment, the polyacetal polymer may contain hemiformal terminal groups in amounts greater than 1.0 mmol/kg, such as in amounts greater than 1.5 mmol/kg. In an alternative embodiment, the polyacetal polymer may contain formyl terminal groups in amounts greater than 2 mmol/kg, such as in amounts greater than 2.5 mmol/kg.

The processes used to form the polyoxymethylene polymers as described above can vary depending upon the particular application. A process, however, can be used which results in a polyacetal resin having a relatively low formaldehyde content. In this regard, in one embodiment, the polymer can be made via a solution hydrolysis process as may be described in U.S. Patent Application Publication Number 2007/0027300 and/or in United States Patent Application Number 2008/0242800, which are both incorporated herein by reference. For instance, in one embodiment, a polyoxymethylene polymer containing aliphatic or cycloaliphatic dial units can be degraded via solution hydrolysis by using methanol and water with triolethylene.

Polyacetal resins or polyoxymethylenes that may be used in accordance with the present disclosure generally have a melting point of greater than about 150 degrees C. The molecular weight of the polymer can generally range from about 2,000 to about 1,000,000, such as from about 7,000 to about 150,000. The polymer can have a meltflow rate (MVR 190-2.16) from about 0.3 to about 20 g/10 min, and particularly from about 2 to about 9 g/10 min (ISO 1133).

In general, the polymer composition can contain a polyacetal polymer resin in an amount greater than about 60% by weight, such as in an amount greater than about 70% by weight, such as in an amount greater than about 80% by weight, such as in an amount greater than about 90% by weight. The polyacetal resin polymer is generally present in an amount less than about 95% by weight. Other thermoplastic polymer resins may also be present in minor amounts. For instance, one or more thermoplastic polymer resins may also be present in the composition in an amount less than about 50% by weight, such as in an amount less than about 10% by weight, such as in an amount less than about 5% by weight. Such other thermoplastic resins may include polyolefin resins, polyester resins, and the like.

As described above, the polyacetal resin may be combined with a metallic pigment, such as metal flakes. The metal flakes can have a plate-like shape. The particles can be polished or otherwise have a high reflectivity and can be lenticular. In one embodiment, the plate-like particles can have an aspect ratio of greater than about 4:1, such as greater than about 8:1, such as from about 10:1 to about 50:1.

The plate-like particles can have a median diameter of greater than about 12 microns, such as greater than about 14 microns. For instance, the plate-like particles can have a median diameter of from about 15 microns to about 650 microns. In one particular embodiment, the plate-like particles have a size of from about 15 microns to about 30 microns.

The metallic pigment may be present in the polymer composition in an amount from about 0.01% to about 20% by weight, such as from about 0.1% to about 15% by weight. For example, the metallic pigment may be present in the polymer composition in an amount from about 0.25% to about 10% by weight, such as from about 0.5% to about 5% by weight.

The metallic pigment may comprise any suitable metal, such as metals of Group I-B, III-A, IV, VI-B, and VIII of the Periodic Table. Physical mixtures of these metallic pigments and alloys of these pigments may also be employed. In particular examples, the metallic pigment may include aluminum, bronze, brass, chromium, copper, gold, iron, molybdenum, nickel, tin, titanium, zinc and the like. In one embodiment, two metallic pigments may be combined that have different average particle sizes.

In one embodiment, the metallic pigment may comprise an aluminum pigment that contains elemental aluminum. The aluminum pigment, for instance, can be very thin having a thickness of less than about 1 micron and can have a median diameter as described above. In one particular embodiment, for instance, the aluminum pigment may have a median diameter of from about 12 microns to about 18 microns. The aluminum pigment can have a pronounced flop, a high brilliance and be highly reflective.

In one embodiment, the aluminum pigment can contain greater than about 80% by weight aluminum. The aluminum pigment can be present alone or in combination with other additives, such as a carrier. For instance, the aluminum pigment may be present in combination with a thermoplastic polymer, such as a polyolefin, a purified medical white oil, or may be present with a solvent, such as di-isononylphtalate.

In addition to a coloring agent and a thermoplastic polymer, the polymer composition may also contain various other components. For instance, in one embodiment, an ultraviolet light stabilizer may be present. The ultraviolet light stabilizer may comprise a benzophenone, a benzotriazole, or a benzoate. Particular examples of ultraviolet light stabilizers include 2,4-dihydroxy benzophenone, 2-hydroxy-4-methoxybenzophenone, 2-(2'-hydroxy-3',5'-di-t-butylphenyl)benzotriazole, 2-(2'-hydroxy-3'-t-butyl-5'-methylphenyl)-5-chlorobenzotriazole, 2,4-dihydroxybenzophenone, 2-hydroxy-4-methoxybenzophenone, 2-hydroxy-4-octoxybenzophenone, and 5,5-methylene bis(2-hydroxy-4-methoxybenzophenone); 2-(2'-hydroxyphenyl)benzotriazoles, e.g. 2-(2'-hydroxy-5'-methylphenyl)benzotriazole, 2-(2'-hydroxy-5'-t-octylphenyl)benzotriazole, 2-(2'-hydroxy-3',5-di-t-butylphenyl)benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, 2-(2'-hydroxy-3',5'-dicumylphenyl)benzotriazole, and 2,2'-methylene bis(4-t-octyl-6-benzoriazolyl)phenol, phenylsalicylate, resorcinol monobenzoate, 2,4-di-t-butylphenyl-3',5'-di-t-butyl-4'-hydroxybenzoate, and hexadecyl-3,5-di-t-butyl-4-hydroxybenzoate; substituted oxanilides, e.g. 2-ethyl-2'-ethoxyoxanilide and 2-ethoxy-4'-dodecyloxanilide; cyanoacrylates, e.g. ethyl-α-cyano-β,β-diphenylacrylate and methyl-2-cyano-3-methyl-3-(p-methoxyphenyl)acrylate, or mixtures thereof.

In one embodiment, the polymer composition may also include a formaldehyde scavenger, such as a nitrogen-containing compound. The nitrogen scavenger, for instance, may comprise a guanamine compound, such as benzoguanamine.

In one embodiment, the composition may contain a nucleant. The nucleant, for instance, may increase crystallinity and may comprise an oxymethylene terpolymer. In one particular embodiment, for instance, the nucelant may comprise a terpolymer of butanediol diglycidyl ether, ethylene oxide, and trioxane. The nucleant can be present in the composition in an amount greater than about 0.05% by weight, such as greater than about 0.1% by weight. The nucleant may also be present in the composition in an amount less than about 2% by weight, such as in an amount less than about 1% by weight.

Still another additive that may be present in the composition is a sterically hindered phenol compound, which may serve as an antioxidant. Examples of such compounds, which are available commercially, are pentaerythrityl tetrakis[3-(3,5-di-tert-butyl-4-hydroxyphenyl)propionate] (Irganox 1010, BASF), triethylene glycol bis[3-(3-tert-butyl-4-hydroxy-5-methylphenyl)propionate] (Irganox 245, BASF), 3,3'-bis[3-(3,5-di-tert-butyl-4-hydroxyphenyl)propionohydrazide] (Irganox MD 1024, BASF), hexamethylene glycol bis[3-(3,5-di-tert-butyl-4-hydroxyphenyl)propionate] (Irganox 259, BASF), and 3,5-di-tert-butyl-4-hydroxytoluene (Lowinox BHT, Chemtura). Preference is given to Irganox 1010 and especially Irganox 245. The above compounds may be present in the composition in an amount less than about 2% by weight, such as in an amount from about 0.01% to about 1% by weight.

Light stabilizers that may be present in addition to the ultraviolet light stabilizer in the composition include sterically hindered amines. Hindered amine light stabilizers that may be used include oligomeric compounds that are N-methylated. For instance, another example of a hindered amine light stabilizer comprises ADK STAB LA-63 light stabilizer available from Adeka Palmarole. The light stabilizers, when present, can be included in amounts greater than about 0.1% by weight, such as in amounts greater than about 0.5% by weight, but in an amount less than about 2% by weight, such as in an amount less than about 1% by weight.

Fillers that may be included in the composition include glass beads, wollastonite, loam, molybdenum disulfide or graphite, inorganic or organic fibers such as glass fibers, carbon fibers or aramid fibers. The glass fibers, for instance, may have a length of greater than about 3 mm, such as from 5 to about 50 mm. The composition can further include thermoplastic or thermoset polymeric additives, or elastomers such as polyethylene, polyurethane, polymethyl methacrylate, polybutadiene, polystyrene, or else graft copolymers whose core has been prepared by polymerizing 1,3-butadiene, isoprene, n-butyl acrylate, ethylhexyl acrylate, or mixtures of these, and whose shell has been prepared by polymerizing styrene, acrylonitrile or (meth)acrylates.

In one embodiment, the composition may also contain one or more lubricants. The lubricant may comprise a polymer wax composition. Lubricants that may be included in the composition include, for instance, N,N'-ethylene bisstearamide. In one embodiment, a polyethylene glycol polymer (processing aid) may be present in the composition. The polyethylene glycol, for instance, may have a molecular weight of from about 1000 to about 5000, such as from about 3000 to about 4000. In one embodiment, for instance, PEG-75 may be present. Lubricants can generally be present in the polymer composition in an amount from about 0.01% to about 5% by weight. For instance, a lubricant can be present in an amount greater than about 0.1% by weight, such as in an amount from about 0.1% to about 1% by weight. The above polyethylene glycol polymer can also be present in an amount up to about 5% by weight. For instance, the polyethylene glycol polymer can be present in an amount from about 0.1% to about 2% by weight, such as from about 0.5% to about 1% by weight.

In addition to the above components, the polymer composition may also contain an acid scavenger. The acid scavenger may comprise, for instance, an alkaline earth metal salt. For instance, the acid scavenger may comprise a calcium salt, such as a calcium citrate. The acid scavenger may be present in an amount of from about 0.01% to about 1% by weight.

Any of the above additives can be added to the polymer composition alone or combined with other additives. In general, each additive is present in an amount less than about 5% by weight, such as in an amount less than about 2% by weight, such as in an amount less than about 1% by weight.

An almost limitless variety of polymer articles may be molded in accordance with the present disclosure. Such articles may include knobs, door handles, automotive panels, interior automotive parts such as bezels, consumer appliance parts, and the like without limitation.

The present disclosure may be better understood with reference to the following example.

Example

In this example, simulation software was used to predict flow rates entering a mold cavity. In particular, a configuration similar to the one illustrated in FIG. 3 was created in AUTODESK MOLDFLOW Injection Molding Simulation Software, which is commercially available from Autodesk, Inc. of San Rafael, Calif.

The simulation was conducted in an embodiment similar to the one illustrated in FIG. 3, where a flow path included two overflow passages and was compared to a simulation completed without any overflow passages. A polyoxymethylene polymer composition was fed to a mold cavity during the simulation. The fill speed or flow rate of the polymer flow was set at 0.2 $in^3$/sec. The simulation software estimated flow rates at a gate entering the mold cavity at 0.25 second intervals.

The following results were obtained:

| | Flow rate at the Gate ($in^3$/sec) | |
| --- | --- | --- |
| Time | Flow path without overflow passages | Flow path with overflow passages |
| 1.00 sec | 0.176 | |
| 1.25 sec | 0.189 | 0.114 |
| 1.50 sec | 0.194 | 0.130 |
| 1.75 sec | 0.194 | 0.154 |
| 2.00 sec | 0.195 | 0.194 |
| 2.25 sec | 0.195 | 0.194 |

As shown above, according to the simulation software, the overflow passages reduced the polymer flow rate for less than about 2 seconds during initial mold fill. As shown, at 1.25 seconds, the flow rate was reduced by approximately 40%. After 1.5 seconds, the flow rate was reduced by approximately 33%. After 1.75 seconds, the flow rate was reduced by approximately 21%. At the 2 second mark, the flow rates were substantially the same. Thus, during the first 1.5 to 1.75 seconds, the flow rate passing through the gate was reduced an average of from about 25% to about 40% due to the presence of the overflow passages.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. An injection molded product comprising:
an article having an exterior surface, wherein the article comprises a thermoplastic polymer, the thermoplastic polymer comprising a homopolymer or a copolymer wherein the homopolymer or copolymer further comprises a polyacetal polymer, a polyarylene sulfide polymer, a polyolefin polymer, a polycarbonate polymer, a polyester polymer, or a combination thereof, at least a portion of the exterior surface comprising an appearance surface that is intended to be viewable when the product is in use, the appearance surface being free of paint and being gate blush-free, including being free of any helical patterns of melt fracture when examined through a scanning electron microscope at a magnification of ×100 and at an angle of 45°, and wherein when a shift in color index is measured according to the BORG spectrophotometric technique, the difference in color index between the gate area and the remainder of the appearance surface does not vary by more than 20%, and wherein the thermoplastic polymer is combined with at least one colorant the article further includes an extension formed from the thermoplastic polymer, the extension including at least a first overflow passage and a second overflow passage wherein the first overflow passage and the second overflow passage each have a volume of from about 50% to about 500% of the volume of the flow path between the first and second overflow passages and the appearance surface.

2. An injection molded product as defined in claim 1, wherein the shift in color index does not vary by more than 10%.

3. An injection molded product as defined in claim 1, wherein the shift in color index does not vary by more than 5%.

4. An injection molded product as defined in claim 1, wherein the colorant comprises a metallic pigment.

5. The molded product of claim 1 wherein the extension further comprises a runner, and wherein the first overflow passage and the second overflow passage divert from a path of the runner.

6. The molded product of claim 5, wherein a cross sectional area of the first overflow passage and the second overflow passage is less than a cross sectional area of the runner.

7. An injection molded product comprising:
an article having an exterior surface, wherein the article comprises a thermoplastic polymer, the thermoplastic polymer comprising a homopolymer or a copolymer wherein the homopolymer or copolymer further comprises a polyacetal polymer, wherein the polyacetal polymer contains hemiformal terminal groups in an amount greater than 1.0 mmol/kg, formyl terminal groups in an amount greater than 2 mmol/kg, or combinations thereof, at least a portion of the exterior surface comprising an appearance surface that is intended to be viewable when the product is in use, the appearance surface being free of paint and being gate blush-free, and wherein when a shift in color index is measured according to the BORG spectrophotometric technique, the difference in color index between the gate area and the remainder of the appearance surface does not vary by more than 20%, wherein the thermoplastic polymer is combined with at least one colorant comprising a metallic pigment, the metallic pigment being present in the thermoplastic polymer in an amount from about 0.5% by weight to about 20% by weight, the metallic pigment comprising aluminum, bronze, brass, chromium, copper, gold, iron, molybdenum, nickel, tin, titanium, zinc, or mixtures thereof, the metallic pigment having a thickness of less than about 1 micron and an aspect ratio of at least about 8:1 and being present in the thermoplastic polymer with a carrier, the thermoplastic polymer further containing a lubricant the article further includes an extension formed from the thermoplastic polymer, the extension including at least a first overflow passage and a second overflow passage wherein the first overflow passage and the second overflow passage each have a volume of from about 50% to about 500% of the volume of the flow path between the first and second overflow passages and the appearance surface.

8. A process for producing the molded product of claim 1 comprising:
feeding a molten polymer material into a flow path that leads into a mold cavity;
during initial flow of the polymer material into the flow path, temporarily diverting a portion of the flow into an overflow passage;
filling the mold cavity with the polymer material to form a molded article, wherein initial flow of the polymer material into the mold occurs simultaneously while a portion of the flow is being diverted into the overflow passage; and
removing the molded article from the mold.

9. A process as defined in claim 8, wherein the polymer material comprises a polyoxymethylene polymer.

10. A process as defined in claim 8, wherein the polymer material contains a metallic pigment.

11. A process as defined in claim 10, wherein the polymer material comprises a polyoxymethylene polymer.

12. A process as defined in claim 8, wherein initial flow of the polymer material into the flow path is temporarily diverted in a manner that produces a reduced initial flow rate into the mold and wherein the mold cavity is filled at the initial flow rate and at a later fill flow rate, the initial flow rate being from about 5% to about 90% less than the fill rate.

13. A process as defined in claim 12, wherein the initial flow rate is from about 5% to about 50% of the fill flow rate.

14. A process as defined in claim 12, wherein the initial flow rate is from about 20% to about 50% of the fill flow rate.

15. A process as defined in claim 8, wherein the polymer flow has a flow mass and wherein the flow mass initially enters the mold cavity simultaneously while a portion of the polymer flow is being temporarily diverted into the overflow passage.

* * * * *